(12) United States Patent
Song

(10) Patent No.: US 11,559,902 B2
(45) Date of Patent: Jan. 24, 2023

(54) ROBOT SYSTEM AND CONTROL METHOD OF THE SAME

(71) Applicant: LG ELECTRONICS INC., Seoul (KR)

(72) Inventor: Joonkeol Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 628 days.

(21) Appl. No.: 16/566,233

(22) Filed: Sep. 10, 2019

(65) Prior Publication Data

US 2020/0016767 A1 Jan. 16, 2020

(30) Foreign Application Priority Data

Aug. 21, 2019 (KR) ........................ 10-2019-0102266

(51) Int. Cl.
*B25J 9/16* (2006.01)
*B25J 13/06* (2006.01)
*B25J 19/02* (2006.01)
*B25J 19/04* (2006.01)

(52) U.S. Cl.
CPC ............. *B25J 13/06* (2013.01); *B25J 9/1635* (2013.01); *B25J 9/1697* (2013.01); *B25J 19/023* (2013.01); *B25J 19/04* (2013.01)

(58) Field of Classification Search
USPC ................................................ 700/245–264
See application file for complete search history.

(56) References Cited

U.S. PATENT DOCUMENTS

| 7,187,999 | B2 * | 3/2007 | Okamoto | G05D 1/0274 700/246 |
|---|---|---|---|---|
| 9,766,604 | B2 * | 9/2017 | Kawamoto | G05D 1/0038 |
| 9,802,317 | B1 * | 10/2017 | Watts | G05B 19/402 |
| 10,625,432 | B2 * | 4/2020 | Wagner | B07C 3/18 |
| 2006/0112034 | A1 * | 5/2006 | Okamoto | B25J 9/1697 706/16 |
| 2008/0240511 | A1 * | 10/2008 | Ban | G06T 1/0007 901/30 |
| 2011/0010009 | A1 * | 1/2011 | Saito | B25J 9/1612 703/13 |
| 2012/0072023 | A1 * | 3/2012 | Ota | B25J 9/1664 901/1 |
| 2013/0238131 | A1 * | 9/2013 | Kondo | B25J 9/1697 700/259 |
| 2013/0346348 | A1 * | 12/2013 | Buehler | G06F 17/00 901/31 |
| 2017/0142340 | A1 * | 5/2017 | Kishi | G06T 1/0014 |
| 2017/0368687 | A1 * | 12/2017 | Huang | B25J 9/1612 |
| 2019/0001489 | A1 * | 1/2019 | Hudson | G05B 13/027 |
| 2019/0079924 | A1 * | 3/2019 | Sugiura | B25J 9/161 |
| 2019/0091865 | A1 * | 3/2019 | Amacker | B25J 9/1697 |

(Continued)

*Primary Examiner* — Jonathan L Sample
(74) *Attorney, Agent, or Firm* — Birch, Stewart, Kolasch & Birch, LLP

(57) ABSTRACT

A robot system includes: a robot including an end effector connected to an arm thereof; a vision sensor mounted to the robot; and a controller configured to output an operation signal that enables the robot to operate when an input is generated through a touch screen. Each of an object and a target to which the object is placed is inputted through the touch screen. The touch screen displays a recommendation region of the target in a distinguished manner.

16 Claims, 8 Drawing Sheets

(56) References Cited

U.S. PATENT DOCUMENTS

2019/0389062 A1* 12/2019 Truebenbach ......... B25J 9/1676
2020/0101610 A1*  4/2020 Thackston ............. B25J 9/1612
2020/0117212 A1*  4/2020 Tian ...................... B25J 9/1689
2020/0117213 A1*  4/2020 Tian ..................... G05D 1/0274

* cited by examiner

ROBOT SYSTEM AND CONTROL METHOD OF THE SAME

CROSS-REFERENCE TO RELATED APPLICATIONS

This application claims the benefit of priority to Korean Patent Application No. 10-2019-0102266, filed in the Korean Intellectual Property Office on Aug. 21, 2019, the entire contents of which are incorporated herein by reference.

BACKGROUND

The present disclosure relates to a robot system and a control method of the same.

Robots are machines that automatically process given tasks or operate with their own capabilities. The application fields of robots are generally classified into industrial robots, medical robots, aerospace robots, and underwater robots. Recently, communication robots that can communicate with humans by voices or gestures have been increasing.

For example, the robot may include an end effector capable of gripping an object and at least one arm capable of three-dimensionally moving or rotating the end effector. The end effector may pick an object, and then load the picked object on a target such as a table or a working table.

The robot may be operated by an operation tool such as a robot teaching pendent, and a worker may operate the operation tool such as the robot teaching pendent to adjust a position or an angle of the end effector.

SUMMARY

Embodiments provide a robot system capable of easily operating a robot and a control method of the same.

Embodiments also provides a robot system capable of safely and quickly transferring an object and a control method thereof.

In one embodiment, a robot system includes: a robot including an end effector connected to an arm thereof; a vision sensor mounted to the robot; and a controller configured to output an operation signal that enables the robot to operate when an input is generated through a touch screen.

Each of an object and a target to which the object is placed may be inputted through the touch screen. The touch screen may display a recommendation region of the target in a distinguished manner.

The touch screen may display a non-recommendation region of the target in a different manner from the recommendation region.

When the vision sensor photographs a plurality of objects, which overlap each other, the touch screen may display an image in which the plurality of objects are spaced apart from each other.

When an object of the plurality of objects is inputted through the touch screen, the touch screen may display a plurality of menu items, and the plurality of menu items may include a pick menu item.

When the vision sensor photographs a plurality of targets, which overlap each other, the touch screen may display an image in which the plurality of targets are spaced apart from each other.

When a target of the plurality of targets, to which the object is placed, is inputted through the touch screen, the touch screen may display a plurality of menu items, and the plurality of menu items may include a place menu item.

The touch screen may display a region of the target, which has an inclination less than a set inclination, as the recommendation region.

The touch screen may display a region of the target, which has a friction coefficient greater than a set friction coefficient, as the recommendation region.

The touch screen may display a region of the target, which has an area greater than a projected area of the object, as the recommendation region.

When the recommendation region has an area greater than the projected area of the object, the touch screen may zoom-in and display the recommendation region.

The touch screen may display a plurality of recommendation regions in a different manner.

In another embodiment, a control method of a robot system including: a robot including an end effector connected to an arm; a vision sensor mounted to the robot; and a controller configured to output an operation signal that enables the robot to operate when an input is generated through a touch screen, includes: displaying an object, which moves the vision sensor for searching the object and displays an image obtained by photographing the object by the vision sensor on the touch screen; displaying a pick menu, which displays a pick menu on the touch screen when the object displayed through the touch screen is inputted; displaying an target, which moves the vision sensor for searching the target and displays the image obtained by photographing the target by the vision sensor after the pick menu item is inputted through the touch screen; displaying a place menu item, which displays a place menu item on the touch screen when the target displayed through the touch screen is inputted; recommending, which displays a recommendation region of the target in a distinguished manner on the touch screen after the place menu item displayed through the touch screen is inputted; and operating the robot, which operates the robot to move the object to the recommendation region when the recommendation region of a whole region of the touch screen is inputted.

In the displaying of the object, when a plurality of objects, which overlap each other, are photographed by the vision sensor, the touch screen may display an image in which the plurality of objects are spaced apart from each other.

In the displaying of the target, when a plurality of targets, which overlap each other, are photographed by the vision sensor, the touch screen may display an image in which the plurality of targets are spaced apart from each other.

In the recommending, the touch screen may display a non-recommendation region of the target in a different manner from the recommendation region.

In the recommending, the touch screen may display a region of the target, which has an inclination less than a set inclination, as the recommendation region.

In the recommending, the touch screen may display a region of the target, which has a friction coefficient greater than a set friction coefficient, as the recommendation region.

In the recommending, the touch screen may display a region of the target, which has an area greater than a projected area of the object, as the recommendation region.

In the recommending, when the region of the target, which has an area greater than the projected area of the object, is provided in plurality, the touch screen may display the plurality of recommendation regions in different colors.

The recommending may further include zooming-in, which enables the touch screen to zoom-in and display the recommendation region when the recommendation region has the area greater than the projected area.

In the operating of the robot, the controller may generate a path of the robot in consideration of a position of the object and a position of the target, and then transmits an operation signal on the basis of the path of the robot.

BRIEF DESCRIPTION OF THE DRAWINGS

FIG. 12 is a view illustrating a state when the recommendation region in FIG. 11 is zoomed-in.

DETAILED DESCRIPTION OF THE EMBODIMENTS

Figure 1:
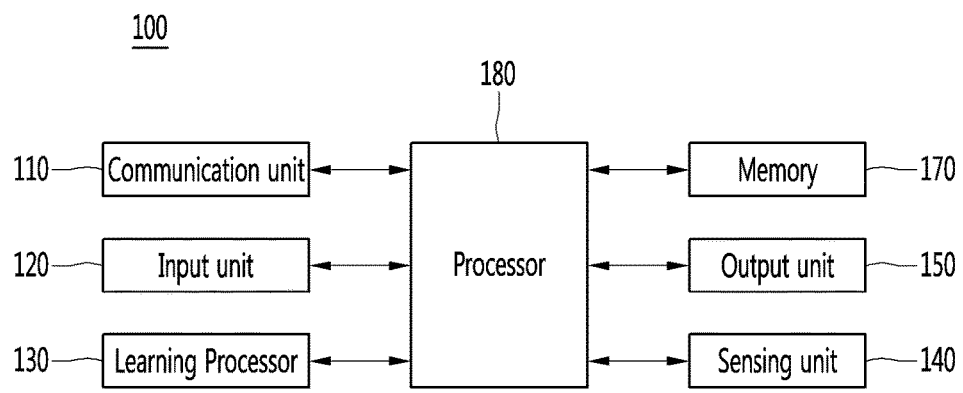
FIG. 1 is a view illustrating an AI device of a robot system according to an embodiment.

Hereinafter, preferred embodiments will be described in detail with reference to the drawings.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 500 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 540 of the AI server 500.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 540 of the AI server 500, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 500. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
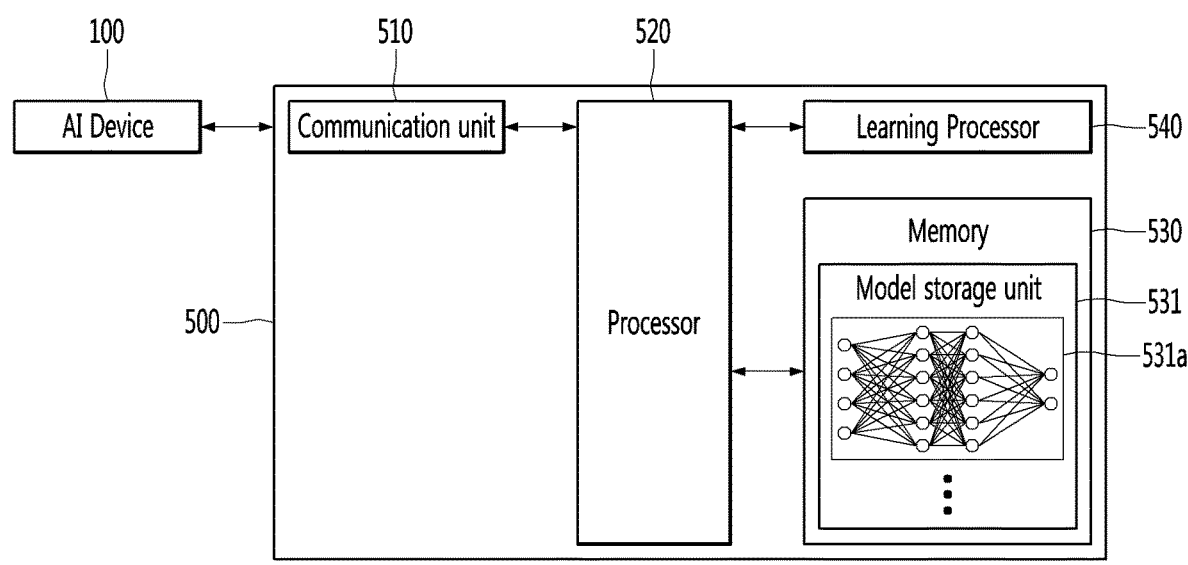
FIG. 2 is a view illustrating an AI server of the robot system according to an embodiment.

FIG. 2 illustrates an AI server 500 connected to a robot according to an embodiment of the present invention.

Referring to FIG. 2, the AI server 500 may refer to a device that learns an artificial neural network by using a machine learning algorithm or uses a learned artificial neural network. The AI server 500 may include a plurality of servers to perform distributed processing, or may be defined as a 5G network. At this time, the AI server 500 may be included as a partial configuration of the AI device 100, and may perform at least part of the AI processing together.

The AI server 500 may include a communication unit 510, a memory 530, a learning processor 540, a processor 560, and the like.

The communication unit 510 can transmit and receive data to and from an external device such as the AI device 100.

The memory 530 may include a model storage unit 531. The model storage unit 531 may store a learning or learned model (or an artificial neural network 531a) through the learning processor 540.

The learning processor 540 may learn the artificial neural network 531a by using the learning data. The learning model may be used in a state of being mounted on the AI server 500 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 530.

The processor 560 may infer the result value for new input data by using the learning model and may generate a response or a control command based on the inferred result value.

Figure 3:
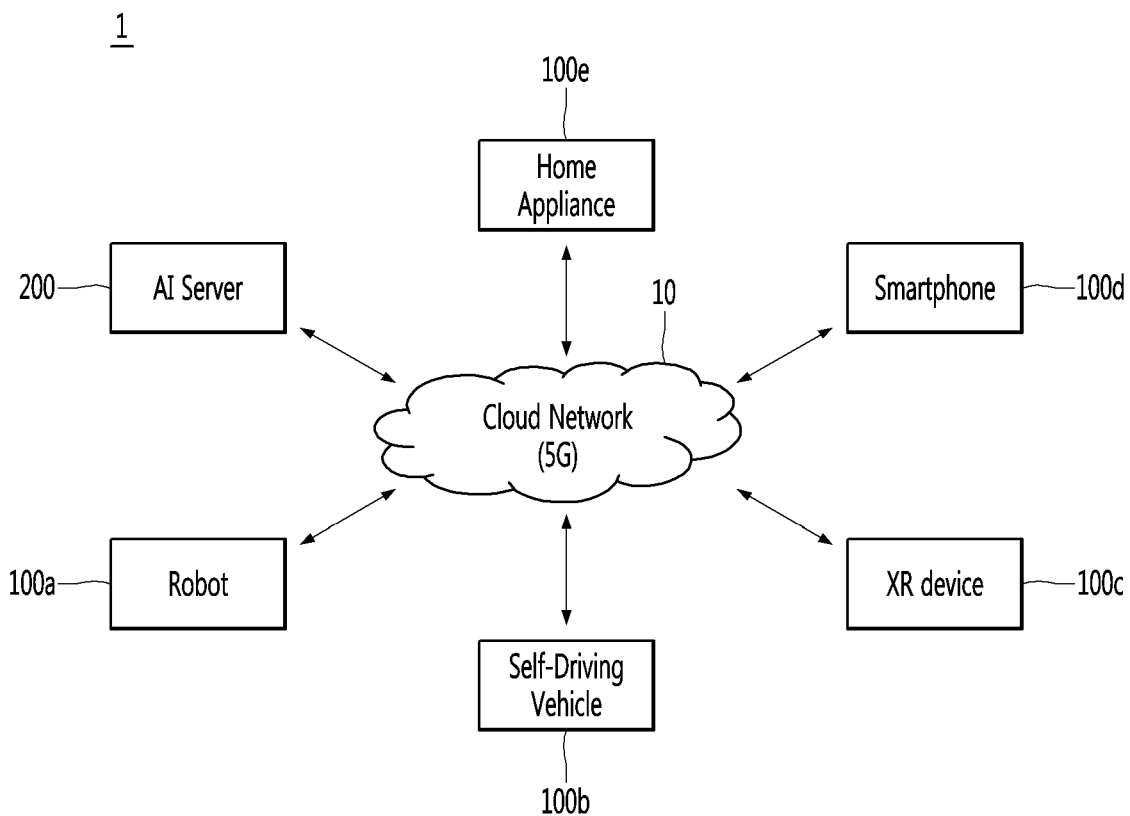
FIG. 3 is a view illustrating an AI system with the robot system according to an embodiment applied.

FIG. 3 illustrates an AI system 1 according to an embodiment of the present invention.

Referring to FIG. 3, in the AI system 1, at least one of an AI server 500, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 500 configuring the AI system 1 may be connected to each other through the cloud network 10. In particular, each of the devices 100a to 100e and 500 may communicate with each other through a base station, but may directly communicate with each other without using a base station.

The AI server 500 may include a server that performs AI processing and a server that performs operations on big data.

The AI server 500 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 500 may learn the artificial neural network according to the machine learning algorithm instead of the AI devices 100a to 100e, and may directly store the learning model or transmit the learning model to the AI devices 100a to 100e.

At this time, the AI server 500 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 500.

At this time, the robot 100a may perform the operation by generating the result by directly using the learning model, but the sensor information may be transmitted to the external device such as the AI server 500 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

Figure 4:
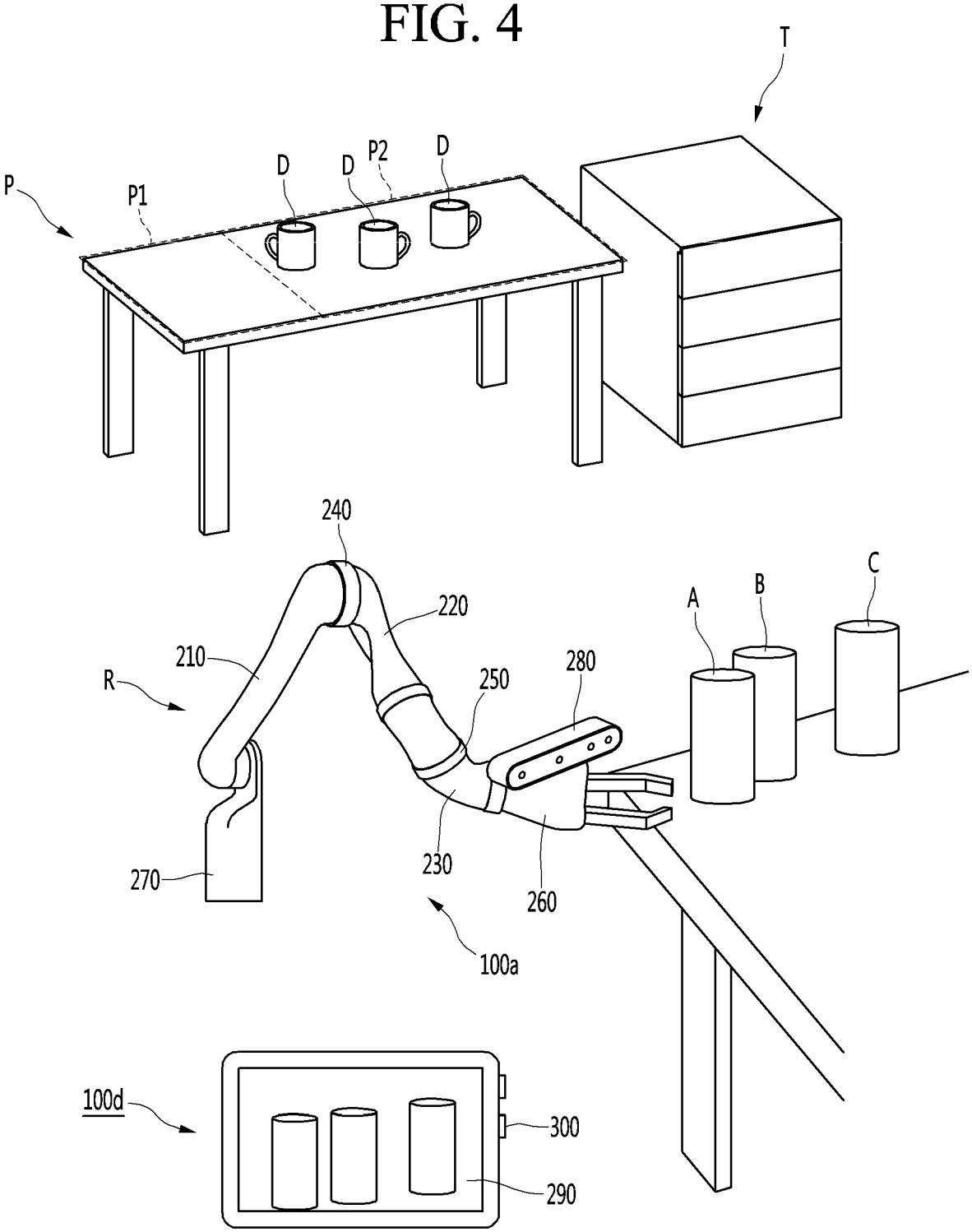
FIG. 4 is a view illustrating a robot and a controller of the robot system according to an embodiment.

FIG. 4 is a view illustrating a robot and a controller of a robot system according to an embodiment.

Referring to FIG. 4, a robot 100a may include an arm and an end effector 260 connected to the arm.

The robot 100a may include a plurality of arms 210, 220, and 230 and at least one arm connector 240 and 250. The arm connector 240 and 250 may connect a pair of arms, which are adjacent to each other, and the plurality of arms 210, 220, and 230 may be sequentially arranged with the arm connecter 240 and 250 therebetween.

The end effector 260 may be a robot hand or a gripper, and mounted to an end of the robot 100a so as to perform a work of gripping an object to transfer the object to a predetermined position.

The plurality of arms 210, 220, and 230 and the at least one arm connector 240 and 250 may constitute a robot arm R, and the robot arm R may three-dimensionally move and rotate the end effector 260 so that the robot transfers the object.

The robot 100a may include at least one motor or actuator to rotate the arms 210, 220, and 230, the arm connector 240 and 250, and the end effector 260.

The robot arm R may include various components as long as the components are capable of three-dimensionally moving and rotating the end effector 260. However, the embodiment is not limited to the number or shape of each of the plurality of arms 210, 220, and 230, the at least one arm connector 240 and 250, and the motor or the actuator.

The robot 100*a* may further include a robot connector 270 that connects and supports another 210 of the plurality of arms 210, 220, and 230 to another object such as a robot base.

The robot system may further include a vision sensor 280 mounted to the robot 100*a*.

For example, the vision sensor 280 may include a RGB camera capable of sensing a shape or color of each of an object A, B, and C or a target P and T.

For another example, the vision sensor 280 may include a RGB-D camera capable of sensing a shape, color, or distance of each of the object A, B, and C or the target P and T.

The vision sensor 280 may be mounted to move or rotate in conjunction with the arm 230 or the end effector 260 when the arm 230 or the end effector 260 rotates or moves. The vision sensor 280 may be mounted to the end effector 260 or a component adjacent to the end effector 260 among components of the robot 100*a* to acquire an image of the object A, B, and C or the target P and T, which is disposed around the robot 100*a*.

When the vision sensor 280 is mounted to a component besides the end effector 260, the vision sensor 280 may be mounted to the arm 230 that is the most adjacent to the end effector 260 among the plurality of arms 210, 220, and 230 or mounted to the arm connector 250 that is the most adjacent to the end effector 260 among the plurality of arm connector 240 and 250.

The robot 100*a* may operate by a separate controller, and an operator such as a user (hereinafter, referred to as an operator) may operate the controller to operate the robot 100*a*.

The controller may be a controller or a control panel, which operates the robot 100*a*. The controller may be a remote controller that is spaced apart from the robot 100*a* to operate the robot 100*a* from a distance.

The controller may be directly connected to the robot 100*a* in a wired or wireless manner, or connected through a cloud network 10 and/or a server 500.

The controller may include a teaching pendent for a robot, or include a mobile phone, a smartphone, a desktop computer, a notebook computer, a personal digital assistant (PDA), a portable multimedia player (PMP), a tablet PC, or a wearable device. Hereinafter, the controller will be designated by reference numeral 100*d* for convenience.

The controller 100*d* may include a touch screen 290 to which a user inputs a touch. The controller 100*d* may further include at least one button 300.

Hereinafter, the controller 100*d* will be described as the teaching pendent for a robot as an example. However, the embodiment is not limited to the teaching pendent for a robot. For example, the controller 100*d* may include a mobile phone in which an application capable of controlling the robot 100*a* is installed.

The touch screen 290 and the button 300 may constitute an input unit 120 to which all sorts of commands enabling the robot 100*a* to operate are inputted. The operator may input all sorts of commands enabling the robot 100*a* to operate through the touch screen 290 and the button 300. Particularly, when the command is inputted through the touch screen 290, the controller 100*d* may directly output an operation signal to the robot 100*a* or output an operation signal to the robot 100*a* through the network 10, the server 500, or the like.

In this specification, a feature of outputting an operation signal to the robot 100*a* may represent a feature of directly outputting an operation signal to the robot 100*a* or a feature of outputting an operation signal to the robot 100*a* through the network 10, the server 500, or the like.

The operator may operate the controller 100*d* so that the robot 100*a* picks the object B and then put the object B on the target P. The operator may input the object B and the target P, which are seen through the touch screen 290.

The touch screen 290 may provide a plurality of screens for an input of the object B, an input of a pick command, an input an the target P, and an input of a place command, and the plurality of screens may be provided simultaneously or sequentially.

At least one screen of the plurality of screens may include a menu item M (refer to FIG. 7) to which the operator is able to input a pick command or a place command. At least one screen of the plurality of screens may allow the user to display a recommendation region and a non-recommendation region.

The robot system may pick one object B of the plurality of objects A, B, and C by an input caused by the operator and an operation of the robot 100*b* caused by the input, and then place the picked object B on one P of the plurality of targets P and T disposed around the plurality of objects A, B, and C.

The operator may select the object B to be picked among the plurality of objects A, B, and C and input the selected object B through the touch screen 290, and then select the target P to which the object B is placed among the plurality of targets P and T and input the selected target through the touch screen 290.

When each of the object B to be picked by the robot 100*a* and the target P to which the object B is placed is selected by a touch of the touch screen 290, the controller 100*d* may control the robot 100*a* so that the robot 100*a* put the selected object B on the selected target P.

The robot system may allow the robot 100*a* to select each of the object B to be picked and the target P to which the object B is placed before the robot 100*a* operates to put the object B on the target P.

When each of the object B and the target P is selected through the touch screen 290, the controller 100*d* may generate a path along which the object B is transferred to the target P and output an operation signal to the robot 100*a* so that the end effector 260 transfers the object B along the generated path.

When the operation of the robot 100*a* by the controller 100*d* is described in detail, the controller 100*d* may control the robot 100*a* so that the end effector 260 is able to pick the object B.

The controller 100*d* may control the robot 100*a* so that the end effector 260 moves to a position (X, Y, and Z coordinates) of the object B, and control the robot 100*a* so that the end effector 260 grips and lifts the object B.

The controller 100*d* may control the robot 100*a* so that the end effector 260 moves to a position of the object B to put the object B on the target P, and control the robot 100*a* so that the robot 100*a* puts the object B on the target P.

The robot system may provide various screens through the screen 290 when the robot 100*a* operates or is in a stop state.

The touch screen 290 desirably provides a screen allowing the operator to simply operate the touch screen 290.

Also, the touch screen 290 desirably provides a screen for safely and quickly putting the object B on the target P.

The vision sensor 280 illustrated in FIG. 4 may photograph the plurality of objects A, B, and C around the plurality of objects A, B, and C, and at least two objects A and B, which have portions overlap each other, may be photographed by the vision sensor 280.

The touch screen 290 may display the overlapped plurality of objects A and B to be spaced apart from each other instead of directly displaying an image of the substantially overlapped plurality of objects A and B. That is, the plurality of objects A and B displayed through the touch screen 290 may be displayed to be spaced apart from each other.

The controller 100d or the server 500 may search information of each of the overlapped plurality of objects A and B by using the artificial neural network or determine similarity or the like of each of the overlapped plurality of objects A and B, and acquire an entire image of the object B disposed behind the overlapped plurality of objects A and B.

The robot system may display an entire image of the object B, which is disposed relatively backward, of the overlapped plurality of objects A and B next to an image of the object A, which is disposed relatively forward. Thus, when the operator watches the image from the outside of the touch screen 290, the substantially overlapped plurality of objects A and B may be displayed to be spaced apart from each other.

As described above, when the substantially overlapped plurality of objects A and B are separately displayed, the operator may further exactly recognize information of the overlapped objects A and B, and exactly touch (or point) a region corresponding to the object to be desirably moved when a touch is generated through the touch screen 290.

Also, when the touch screen 290 directly displays the substantially overlapped plurality of objects A and B, and a region of the object B disposed backward, which is not overlapped with the object A, (hereinafter, referred to as a non-overlapped region) is small, the operator may be difficult to quickly and exactly touch a region of the object B, which is displayed through the touch screen 290, and accidently touch a region of the object A disposed forward in the touch screen. Resultantly, the object A that is not substantially desired to be selected may be selected.

Thus, as illustrated in FIG. 4, when the overlapped objects A and B are displayed to be spaced apart from each other in the touch screen 290, the operator may exactly and quickly touch the region of the object B disposed backward in the touch screen 290, and an error of touching the region of the object A that is not desired to be transferred may be minimized.

The overlapped objects A and B may be photographed by the vision sensor 280 when the vision sensor 280 is moving or stopped, and the touch screen 290 may photograph the overlapped objects A and B and then automatically separate and display the overlapped objects A and B.

Also, when the vision sensor 280 is moving or stopped, the touch screen 290 may directly display an overlapped state of the overlapped objects A and B when the overlapped objects A and B are photographed by the vision sensor 280 and separately display a separated state of the overlapped objects A and B when the operator performs an additional operation.

For example, the touch screen 290 may directly display the overlapped state of the overlapped objects A and B, and the operator may touch the overlapped region between the objects A and B in the touch screen 290 as many as a set number (e.g., two times) within a set time (e.g., one second). When the above-described operation is performed, the touch screen 290 may not display the overlapped objects A and B as in the overlapped state, and may display the same as in the separated state.

When the objects A and B are separately displayed as described above, the operator may quickly and simply select the desired object B through the touch screen 290.

The vision sensor 280 illustrated in FIG. 4 may photograph the plurality of targets P and T around the plurality of targets P and T, and at least two objects P and T, of which portions overlap each other, may be photographed by the vision sensor 280.

The touch screen 290 may separately display the overlapped plurality of targets P and T instead of directly displaying an image of the substantially overlapped plurality of objects P and T as in the overlapped state. Since the plurality of targets P and T in the image displayed through the touch screen 290 may be displayed in the state of being spaced apart from each other on the touch screen 290, and the feature and effect in which the plurality of objects P and T are separated and displayed on the touch screen 290 are the same as or similar to a feature in which the plurality of objects A and B are separately displayed on the touch screen 290, detailed description regarding this will be omitted to avoid overlapped description.

The touch screen 290 may distinguish and display a region, which is appropriate for putting the object B thereon, of the target P on which the object B is placed, (hereinafter, referred to as an appropriate region or recommendation region) and a region, which is not appropriate for putting the object B, of the target B (hereinafter, referred to as an inappropriate region or non-recommendation region).

When the target P on which the object B is placed is selected, the robot system may estimate a physical quantity of the target P on which the object B is placed and acquire data of the target P to be placed by using the artificial neural network. The robot system may distinguish a region P1 (appropriate region), which is appropriate for putting the object B thereon, and a region P2 (inappropriate region), which is inappropriate for putting the object B thereon, by the estimated physical quantity and the acquired data.

Before the selected object B is put on the target P, another object D may exist on the target P, and when the target P is photographed by the vision sensor 280, the another object D may be photographed together with the target P. Information including a shape or a color of each of the target P and the another object D may be acquired by the image photographed by the vision sensor 280. Particularly, the controller 100d or the server 500 in the robot system may acquire information including a shape or a color of each of the target P or the another object D may be acquired from the acquired image.

The controller 100d or the server 500 may acquire information of factors such as existence and position of a flat portion (hereinafter, referred to as a planar region) of the target P, a friction coefficient of the planar region, an inclination of the planar region, an area of the planar region, and a height allowing the object to be put on the planar region from the information such as the shape and the color of each of the target P and the another object D.

The controller 100d may distinguish the appropriate region and the inappropriate region by using the above-described factors. The controller 100d may determine the appropriate region for putting the object B thereon and the inappropriate region that is inappropriate for putting the object B thereon by using the above-described factors and the artificial neural network.

The controller 100d may determine a region of the target P of the planar region of the target P, on which the another object D is not put, as the appropriate region (or recommendation region).

The controller 100d may calculate an inclination value of the planar region in consideration of a friction coefficient of a bottom surface of the object B and a friction coefficient of the planar region of the target P, and determine a region of the planar region of the target P, which has an inclination value less than a set value, as the appropriate region (or recommendation region).

The controller 100d may determine a region of the planar region of the object P, which has an area greater than a projected area of the object B, as the appropriate region (or recommendation region).

That is, the controller 100d may determine the region on which the another object D is not disposed, the region having a small inclination, the region having a great friction coefficient, and the region having an area greater than the projected area of the object B in the planar region of the selected target P as the appropriate region (or recommendation region).

Also, the controller 100d may determined the region on which the another object is already disposed, the region having a great inclination, the region having a small friction coefficient, and the region having an area less than the projected area of the object B in the selected target P as the inappropriate region (or non-recommendation region).

The controller 100d may determine a specific region of the planar region of the target P as the appropriate region (or recommendation region) or as the inappropriate region (or non-recommendation region) in consideration of the above-described factors in a complex manner.

The touch screen 290 may display a recommendation region R (refer to FIGS. 11 to 13) of the target P, which corresponds to an appropriate region P1, in a distinguishable manner.

The recommendation region R may be defined as a region displayed to be differentiated from another region in the image of the target P displayed through the touch screen 290.

The appropriate region P1 and the recommendation region R, which are substantially the same as each other, are referred to as the appropriate region P1 when described with respect to the target P and referred to as the recommendation region R when described to be displayed on the touch screen 290.

The touch screen 290 may display a region of the object P, on which the another object D, is not disposed as the recommendation region. The touch screen 290 may display a region of the target P, which has an inclination less than a set inclination, as the recommendation region. The touch screen 290 may display a region of the target P, which has a friction coefficient greater than a set fiction coefficient, as the recommendation region. The touch screen 290 may display a region of the target P, which has an area greater than a projected area of the object, as the recommendation region.

The touch screen 290 may display a non-recommendation region AR (refer to FIGS. 11 to 13) of the target P, which corresponds to the inappropriate region P2. The touch screen 290 may display the non-recommendation region AR in conjunction with the recommendation region R.

The inappropriate region P2 and the non-recommendation region AR, which are substantially the same as each other, are referred to as the inappropriate region P2 when described with respect to the target P and referred to as the non-recommendation region AR when described to be displayed on the touch screen 290.

The touch screen 290 may display the recommendation region R and the non-recommendation region AR to be different from each other.

The touch screen 290 may display the recommendation region R and the non-recommendation region AR with different colors from each other.

The touch screen 290 may display the recommendation region R with a blue color and the non-recommendation region AR with a red color. The touch screen 290 may distinguish and display the recommendation region R and the non-recommendation region AR such that sharpness of the non-recommendation region AR is less than that of the recommendation region. The touch screen 290 may display only the recommendation region R with a color such as a green color while displaying the non-recommendation region AR with black and white colors. The touch screen 290 may display the recommendation region R and the non-recommendation region AR to be distinguished such that only one of the recommendation region R and the non-recommendation region AR is flashed on and off at a predetermined frequency.

The above-described display methods of the touch screen 290 may include various display methods as long as two regions (the recommendation region and the non-recommendation region) are clearly distinguished. However, the embodiment is not limited thereto.

The controller 100d may determine the planar region of the target P as a plurality of appropriate regions. The controller 100d may determine a ranking of the plurality of appropriate regions.

The plurality of appropriate regions may be classified into the most optimized appropriate region, the next ranked appropriate region, and the like according to conditions of the above-described all sorts of factors. In this case, the controller 100d may display a plurality of recommendation regions, which correspond to the plurality of appropriate regions, to be different from each other.

The touch screen 290 may display the plurality of recommendation regions R with different colors from each other. For example, the touch screen 290 may display the recommendation region R corresponding to a highest ranked appropriate region with a blue color, the recommendation region R corresponding to a next ranked appropriate region P1 with a yellow color, and the non-recommendation region AR corresponding to the inappropriate region P2 with a red color.

Figure 5:
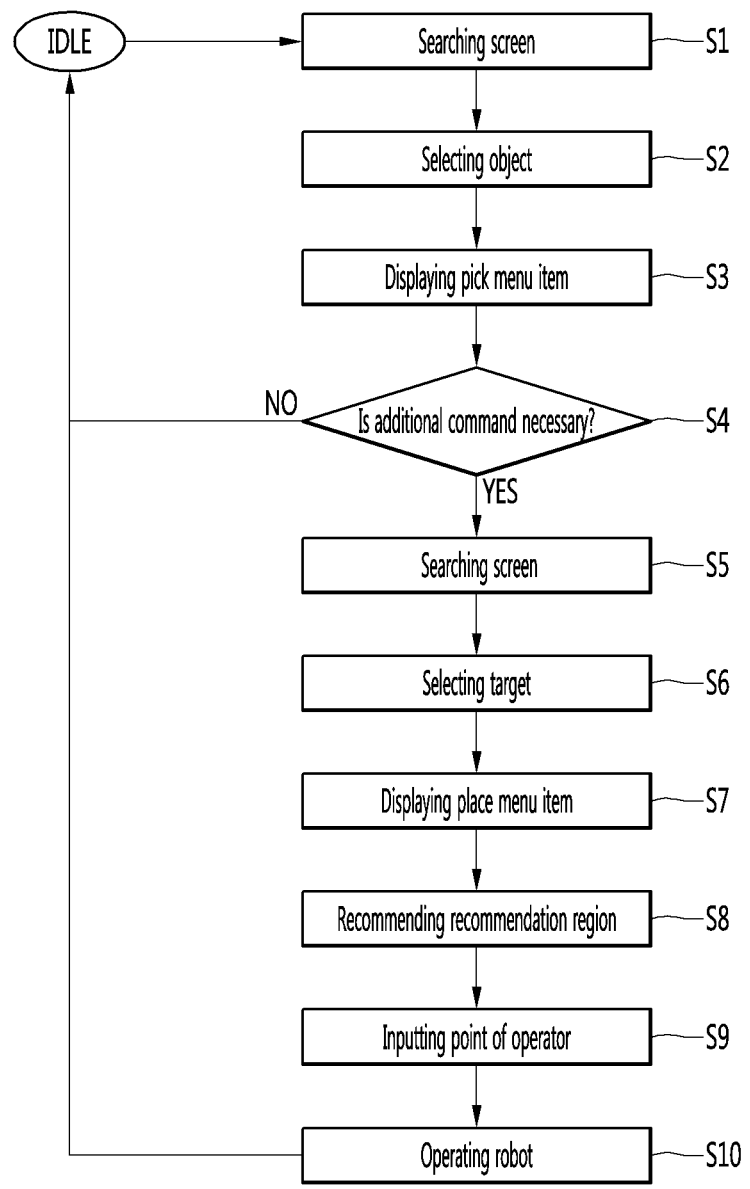
FIG. 5 is a flowchart illustrating a control method of a robot system according to an embodiment.
Figure 6:
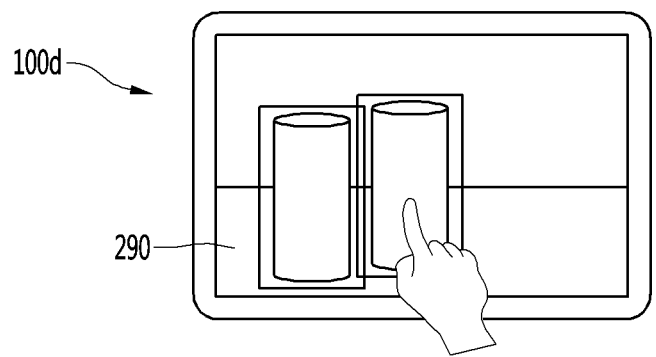
FIG. 6 is a view illustrating a state when a plurality of objects are displayed through a touch screen of a controller, and a user selects one of the plurality of objects according to an embodiment.
Figure 7:
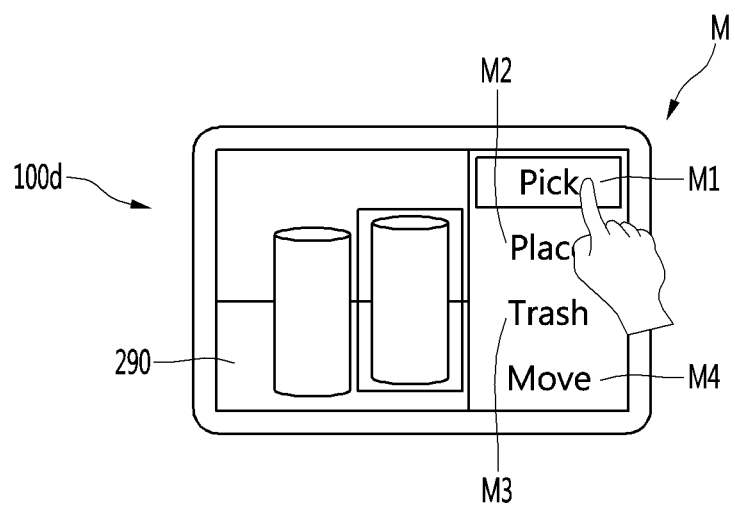
FIG. 7 is a view illustrating a state in which the plurality of objects in FIG. 6 is displayed together with a pick menu item.
Figure 8:
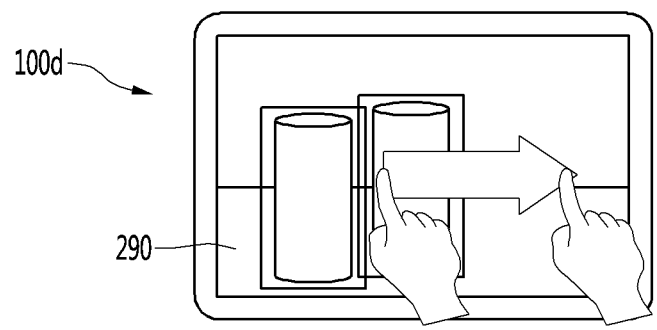
FIG. 8 is a view illustrating a state when a target to which the object in FIG. 7 is placed is searched.
Figure 9:
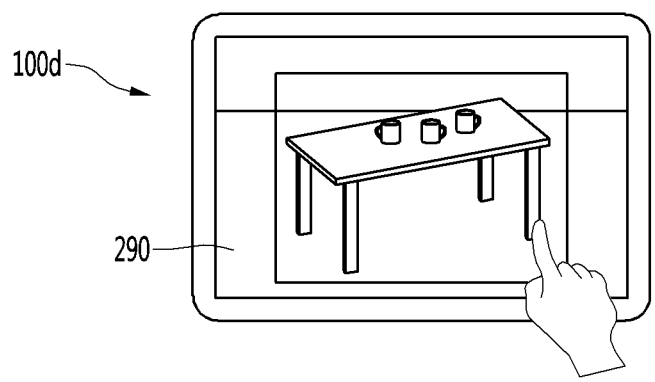
FIG. 9 is a view illustrating a state when an operator selects the target to which the object in FIG. 7 is placed.
Figure 10:
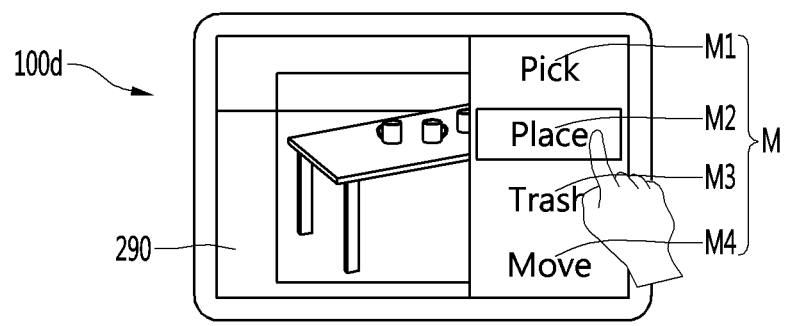
FIG. 10 is a view illustrating a state when the target in FIG. 9 is displayed together with a place menu item.
Figure 11:
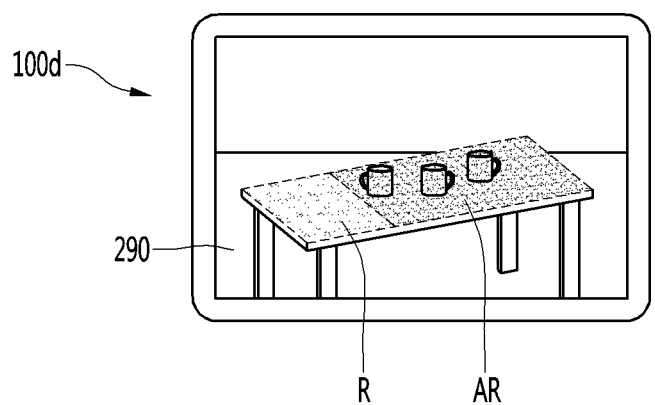
FIG. 11 is a view illustrating a state when a recommendation region of the target in FIG. 6 is displayed together with a non-recommendation region.
Figure 12:
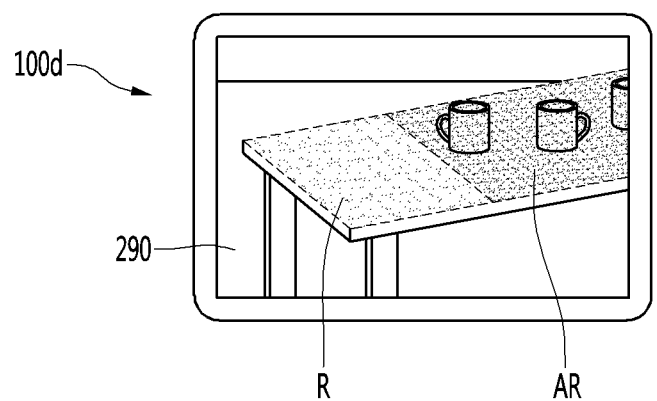

FIG. 5 is a flowchart illustrating a control method of a robot system according to an embodiment, FIG. 6 is a view illustrating a state when a plurality of objects are displayed through a touch screen of a controller, and a user selects one of the plurality of objects according to an embodiment, FIG. 7 is a view illustrating a state in which the plurality of objects in FIG. 6 is displayed together with a pick menu item, FIG. 8 is a view illustrating a state when a target to which the object in FIG. 7 is placed is searched, FIG. 9 is a view illustrating a state when an operator selects the target to which the object in FIG. 7 is placed, FIG. 10 is a view illustrating a state when the target in FIG. 9 is displayed together with a place menu item, FIG. 11 is a view illustrating a state when a recommendation region of the target in FIG. 6 is displayed together with a non-recommendation region, FIG. 12 is a view illustrating a state when the recommendation region in FIG. 11 is zoomed-in, and FIG.

13 is a view illustrating a state when the operator points to input the recommendation region in FIG. 11.

The control method of the robot system may control a robot system including: a robot 100a having an end effector 260 connected to an arm thereof; a vision sensor 280 mounted to the robot 100a; and a controller 100d outputting an operation signal to the robot 100a when an input is generated through a touch screen 290.

The control method of the robot system may control the robot 100a to select each of an object B and a target P according to an input of the touch screen 290, display a recommendation region R of the target, to which the object B is able to be placed, in a distinguishable manner through the touch screen 290, and pick the object B and then place the object B to the target P when the recommendation region R of the touch screen 290 is inputted.

The input of the touch screen 290 described in this specification may be defined as a feature in which the operator touches the touch screen 290.

The control method of the robot system may include a process S1 of displaying an object, a process S3 of displaying a pick menu item, a process S5 of display a target, a process S7 of displaying a place menu item, and a process S8 of recommending. The control method of the robot system may further include a process S9 and S10 of operating a robot.

In the process S1 of displaying of the object, the vision sensor 280 may move to search the object, and an image of the object B photographed by the vision sensor 280 may be displayed on the touch screen 290.

The operator may drag and move a screen of the touch screen 290 in various direction such as up, down, left, and right directions for searching the object B and input a movement command through the touch screen 290.

The robot 100a may move the vision sensor 280 in a direction in which the operator moves the screen, the vision sensor 280 may acquire images while being moved by the robot 100a, and the touch screen 290 may display images acquired by the vision sensor 280.

The operator may search the object B while watching the image displayed through the screen.

The robot system may select and input the object B seen through the touch screen 290 during searching.

The robot system may display the selected object on the touch screen 290. The robot system may check whether objects are overlapped or individually disposed, and when overlapped, the overlapped objects may be separated and individually displayed so that the user is able to select.

For example, the controller 100d may display the selected object on the touch screen 290 and transmit an image of the object selected by the user to a server 500. The server 500 may check whether the objects are overlapped or individually disposed, and when overlapped, the overlapped objects may be separated and individually displayed on the touch screen 290.

More particularly, as illustrated in FIG. 4, the vision sensor 280 may photograph the plurality of objects A, B, and C, and the plurality of objects A, B, and C may be displayed together on the touch screen 290.

As illustrated in FIG. 4, the vision sensor 280 may photograph the overlapped plurality of objects A and B, and the touch screen 290 may display the overlapped plurality of objects A and B to be spaced apart from each other in the process S1 of displaying the object.

As illustrated in FIG. 6, in a process S2, the operator may watch the plurality of objects A and B displayed to be spaced apart from each other on the touch screen 290 and apply an input to the touch screen 290 to select one of the plurality of objects A and B.

As illustrated in FIG. 6, when the substantially overlapped objects A and B are displayed to be spaced apart from each other, the operator may quickly and reliably select and input one B of the objects spaced apart from each other.

When the object B is selected as described above, the robot system may estimate a physical quantity of the selected object B or acquire all sorts of information of the object B from a database, and determine the physical quantity such as a weight, a volume, a size of a bottom, a projected area, and a friction coefficient of the bottom of the selected object, a position of the selected object, and an optimized grip position according to a current shape of the selected object. The above-described information may be stored in a memory.

For example, the server 500 may estimate the physical quantity of the selected object B or acquire all sorts of information of the selected object B from the database. Also, the controller 100d may determine the physical quantity such as a weight, a volume, a size of a bottom, a projected area, and a friction coefficient of the bottom of the selected object, the position of the selected object, and the optimized grip position according to the current shape of the selected object. The above-described information may be stored in a memory 170.

When the object B is selected by the operator, the robot system may display all sorts of commands (pick, place, trash, wipe, press, etc.) related to an operation of the selected object as menu items.

When the object B is inputted through the touch screen 290, the process S3 of displaying the pick menu may be performed, and a pick menu item M1 may be displayed on the touch screen 290 in the process S3 of displaying the pick menu.

In the process S3 of displaying the pick menu, a plurality of menu items M may be displayed together on the touch screen 290, and the plurality of menu items M may include a pick menu item M1, a place menu item M2, a trash menu item M3, and a move menu item M4.

As illustrated in FIG. 7, when the plurality of menu items M are displayed, the operator may select and input the pick menu item M1.

In a process S4, when the pick menu item M1 is inputted by the operator, the controller 100d may determine whether an additional operation command is necessary, and the touch screen 290 may display a command of selecting a target for picking the object B.

When the pick menu item M1 is inputted through the touch screen 290, the process S5 of displaying the target may be performed.

In the process S5 of displaying the target, the vision sensor 280 may move to search the target, and an image of the target photographed by the vision sensor 280 may be displayed on the touch screen 290.

As illustrated in FIG. 8, the operator may drag and move a screen of the touch screen 290 in various direction such as up, down, left, and right directions, and input a movement command through the touch screen 290.

The robot 100a may move the vision sensor 280 in a direction in which the operator moves the screen, the vision sensor 280 may acquire images while being moved by the robot 100a, and the touch screen 290 may display images acquired by the vision sensor 280.

The operator may search the object while watching the image displayed through the screen.

The robot system may select the target P seen through the touch screen 290 during searching in a process S6.

As illustrated in FIG. 9, the robot system may display the selected target P on the touch screen 290, and the operator may select the target through the touch screen 290.

When the target displayed through the touch screen 290 is inputted, the process S7 of displaying the place menu item may be performed, and the place menu item M2 may be displayed on the touch screen 290 in the process S7 of displaying the place menu item.

As illustrated in FIG. 10, in the process S7 of displaying the place menu item, a plurality of menu items M may be displayed together on the touch screen 290, and the plurality of menu items M may include a pick menu item M1, a place menu item M2, a trash menu item M3, and a move menu item M4.

When the plurality of menu items M are displayed on the touch screen 290, the operator may select and input the place menu item M2 as illustrated in FIG. 10.

When the place menu item M2 is inputted by the operator, the robot system may check whether the targets P are overlapped or individually disposed, and when overlapped, the overlapped targets may be separated and individually displayed so that the user is able to select. For example, the controller 100d may display the selected target P on the touch screen 290 and transmit an image of the target P selected by the user to a server 500. The server 500 may check whether the targets P are overlapped or individually disposed, and when overlapped, the overlapped targets may be separated and individually displayed on the touch screen 290.

More particularly, the vision sensor 280 may photograph the plurality of targets P and T, and the plurality of targets P and T may be displayed together on the touch screen 290.

The vision sensor 280 may photograph the overlapped plurality of targets P and T, and the touch screen 290 may display the overlapped plurality of targets P and T to be spaced apart from each other in the process S5 of displaying the target.

The operator may watch the plurality of objects A and B displayed to be spaced apart from each other on the touch screen 290 and apply an input to the touch screen 290 to select one of the plurality of targets P and T.

When the substantially overlapped targets P and T are displayed to be spaced apart from each other, the operator may quickly and reliably select and input one P of the targets spaced apart from each other.

When the target P is inputted by the operator, the robot system may estimate a physical quantity of the selected target or acquire all sorts of information of the target P from a database, and determine a flat portion (hereinafter, referred to as a planar region) of the selected target P, a friction coefficient of the planar region, an inclination of the planar region, an area of the planar region, and a height allowing the object to be put on the planar region. The above-described information may be stored in a memory.

The server 500 may transmit the above-described physical quantity to the controller 100d. The controller 100d may distinguish a region of the selected target P, which is appropriate for putting the object B thereon, (appropriate region) and a region of the selected target P, which is inappropriate for putting the object B thereon, (inappropriate region), and perform the process S8 of recommending. In the process S8 of recommending, the recommendation region R in the image of the target P may be displayed in a distinguishable manner on the touch screen 290.

Figure 13:
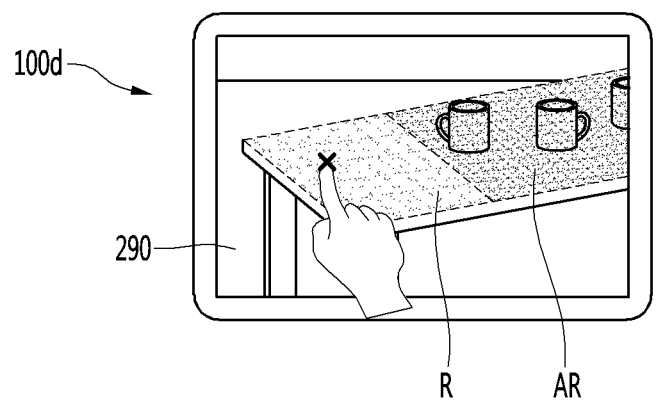
FIG. 13 is a view illustrating a state when the operator points to input the recommendation region in FIG. 11.

As illustrated in FIGS. 11 to 13, in the process S8 of recommending, the touch screen 290 may display the recommendation region R and the non-recommendation region AR in a different manner.

In the process S8 of recommending, the touch screen 290 may display a region of the object B, which has an inclination less than a set inclination, as the recommendation region R.

In the process S8 of recommending, the touch screen 290 may display a region of the object B, which has a friction coefficient greater than a set fiction coefficient, as the recommendation region R.

In the process S8 of recommending, the touch screen 290 may display a region of the object B, which has an area greater than a projected area of the object, as the recommendation region R.

The projected area of the object B may be an entire area of the object B, which is seen when the object B is seen from the top or the bottom, and when the object B has a portion protruding to a side except for the bottom, the projected area may be greater than the bottom area of the object B.

In the process S8 of recommending, when a region of the target P, which has an area greater than the projected area of the object B, is provided in plurality, the touch screen 290 may display the plurality of recommendation regions with different colors from each other.

The process S8 of recommending may further include a process of zooming-in, which zooms-in and displays the recommendation region R on the touch screen 290 when the recommendation region R has an area greater than the projected area as illustrated in FIG. 12.

As illustrated in FIG. 13, the operator may point to input the recommendation region displayed in the process S8 of recommending, and when the recommendation region R of the touch screen 290 is touched and inputted, the robot system may perform a process S9 and S10 of operating a robot, which operates the robot 100a.

As illustrated in FIG. 13, the process S9 and S10 of operating the robot may be initiated such that the operator points to input the recommendation region R.

In the process S9 and S10 of operating the robot, the controller may generate a path of the robot in consideration of a position of the object B, a position of the target, a position of the appropriate region P1 corresponding to the recommendation region R, and a position corresponding to the point-input of the operator, and transmit an operation signal according to the path of the robot.

The robot 100a may be controlled so that the object B moves to the appropriate region P1 and then is placed on the appropriate region P1 according to the operation signal transmitted from the controller 100d or the operation signal received through the server 500, and the object B may be seated on the appropriate region P1 of the target P.

According to an embodiment, the operator may reduce an entire operation time, in which the operator operates the robot for work, and further quickly work by using the robot.

Also, since the recommendation region, which is appropriate for putting the object thereon, is displayed on the touch screen, the worker may select a seated position of the object by the recommendation region, and the object may be safely put on the target.

Also, since the overlapped plurality of objects or the overlapped plurality of targets are displayed to be spaced apart from each other on the touch screen, the worker may further quickly input the object or the target, and a time for the worker to input the object or the target may be reduced.

Also, since the non-recommendation region is displayed together with the recommendation region, an error of inputting the non-recommendation region by the worker may be minimized.

The foregoing description is merely illustrative of the technical idea of the present invention and various changes and modifications may be made by those skilled in the art without departing from the essential characteristics of the present invention.

Therefore, the embodiments disclosed in the present disclosure are intended to illustrate rather than limit the technical idea of the present invention, and the scope of the technical idea of the present invention is not limited by these embodiments.

The scope of protection of the present invention should be construed according to the following claims, and all technical ideas falling within the equivalent scope to the scope of protection should be construed as falling within the scope of the present invention.

What is claimed is:

1. A robot system comprising:
   a robot comprising an end effector connected to an arm thereof;
   a vision sensor mounted to the robot; and
   a controller configured to output an operation signal that enables the robot to operate when an input is generated through a touch screen,
   wherein each of an object and a target to which the object is placed is inputted through the touch screen, and
   the touch screen displays a recommendation region of the target in a distinguished manner,
   wherein the touch screen displays a region of the target, which has an area greater than a projected area of the object, as the recommendation region, and
   wherein when the recommendation region has an area greater than the projected area of the object, the touch screen zooms-in and displays the recommendation region.

2. The robot system of claim 1, wherein the touch screen displays a non-recommendation region of the target in a different manner from the recommendation region.

3. The robot system of claim 1, wherein when the vision sensor photographs a plurality of objects, which overlap each other, the touch screen displays an image in which the plurality of objects are spaced apart from each other.

4. The robot system of claim 3, wherein when an object of the plurality of objects is inputted through the touch screen, the touch screen displays a plurality of menu items, and the plurality of menu items comprise a pick menu item.

5. The robot system of claim 1, wherein when the vision sensor photographs a plurality of targets, which overlap each other, the touch screen displays an image in which the plurality of targets are spaced apart from each other.

6. The robot system of claim 5, wherein when a target of the plurality of targets, to which the object is placed, is inputted through the touch screen, the touch screen displays a plurality of menu items, and the plurality of menu items comprise a place menu item.

7. The robot system of claim 1, wherein the touch screen displays a region of the target, which has an inclination less than a set inclination, as the recommendation region.

8. The robot system of claim 1, wherein the touch screen displays a region of the target, which has a friction coefficient greater than a set friction coefficient, as the recommendation region.

9. The robot system of claim 1, wherein the touch screen displays a plurality of recommendation regions in a different manner.

10. A control method of a robot system comprising: a robot comprising an end effector connected to an arm; a vision sensor mounted to the robot; and a controller configured to output an operation signal that enables the robot to operate when an input is generated through a touch screen, the control method comprising:
    displaying an object, which moves the vision sensor for searching the object and displays an image obtained by photographing the object by the vision sensor on the touch screen;
    displaying a pick menu, which displays a pick menu on the touch screen when the object displayed through the touch screen is inputted;
    displaying a target, which moves the vision sensor for searching the target and displays the image obtained by photographing the target by the vision sensor after the pick menu item is inputted through the touch screen;
    displaying a place menu item, which displays a place menu item on the touch screen when the target displayed through the touch screen is inputted;
    recommending, which displays a recommendation region of the target in a distinguished manner on the touch screen after the place menu item displayed through the touch screen is inputted; and
    operating the robot, which operates the robot to move the object to the recommendation region when the recommendation region of a whole region of the touch screen is inputted,
    wherein in the recommending, the touch screen displays a region of the target, which has an area greater than a projected area of the object, as the recommendation region, and
    wherein the recommending further comprises zooming-in, which enables the touch screen to zoom-in and display the recommendation region when the recommendation region has the area greater than the projected area.

11. The control method of claim 10, wherein in the displaying of the object, when a plurality of objects, which overlap each other, are photographed by the vision sensor, the touch screen displays an image in which the plurality of objects are spaced apart from each other.

12. The control method of claim 10, wherein in the displaying of the target, when a plurality of targets, which overlap each other, are photographed by the vision sensor, the touch screen displays an image in which the plurality of targets are spaced apart from each other.

13. The control method of claim 10, wherein in the recommending, the touch screen displays a non-recommendation region of the target in a different manner from the recommendation region.

14. The control method of claim 10, wherein in the recommending, the touch screen displays a region of the target, which has an inclination less than a set inclination, as the recommendation region.

15. The control method of claim 10, wherein in the recommending, the touch screen displays a region of the target, which has a friction coefficient greater than a set friction coefficient, as the recommendation region.

16. The control method of claim 10, wherein in the operating of the robot, the controller generates a path of the robot in consideration of a position of the object and a position of the target, and then transmits an operation signal on the basis of the path of the robot.

* * * * *